United States Patent
Battistutti

(10) Patent No.: US 12,191,801 B2
(45) Date of Patent: Jan. 7, 2025

(54) STACKABLE PHOTOVOLTAIC MODULE

(71) Applicant: KoBa Holding GmbH, Liebenfels (AT)

(72) Inventor: Rene Battistutti, Poertschach am Woerthersee (AT)

(73) Assignee: KaBa Holding GmbH, Liebenfels (AT)

( * ) Notice: Subject to any disclaimer, the term of this patent is extended or adjusted under 35 U.S.C. 154(b) by 276 days.

(21) Appl. No.: 17/323,839

(22) Filed: May 18, 2021

(65) Prior Publication Data

US 2021/0367552 A1  Nov. 25, 2021

(30) Foreign Application Priority Data

May 19, 2020 (DE) ...................... 10 2020 113 462.2

(51) Int. Cl.
*H02S 30/10* (2014.01)
(52) U.S. Cl.
CPC .................................... *H02S 30/10* (2014.12)
(58) Field of Classification Search
CPC .......................................................... H02S 30/10
See application file for complete search history.

(56) References Cited

U.S. PATENT DOCUMENTS

2015/0256121 A1   9/2015   Kube

FOREIGN PATENT DOCUMENTS

| AU | 2021202990 A1 | | 12/2021 | |
| CA | 3119017 A1 | | 11/2021 | |
| CN | 108667415 A | * | 10/2018 | ............. H02S 30/10 |
| DE | 202017101785 U1 | | 4/2017 | |
| DE | 102011122339 B4 | | 6/2017 | |
| DE | 102020113462 A1 | | 11/2021 | |
| EP | 2346089 A1 | * | 7/2011 | ............. F24J 2/5211 |
| EP | 3913797 A1 | | 11/2021 | |

OTHER PUBLICATIONS

CN 108667415 A English translation as provided by Patent Translate: Powered by EPO and Google, translated on Jul. 1, 2023.*

* cited by examiner

*Primary Examiner* — Golam Mowla
(74) *Attorney, Agent, or Firm* — FISHERBROYLES, LLP; Roger L. Browdy; James E. Mrose

(57) ABSTRACT

A stackable photovoltaic module including at least one photovoltaic element which is circumferentially surrounded by a frame. The frame has at least one projection and at least one recess which engage in one another when a first frame is arranged on a second frame. The frame consists of a plurality of frame elements which are connected by at least one connector.

24 Claims, 5 Drawing Sheets

STACKABLE PHOTOVOLTAIC MODULE

Figure 1:
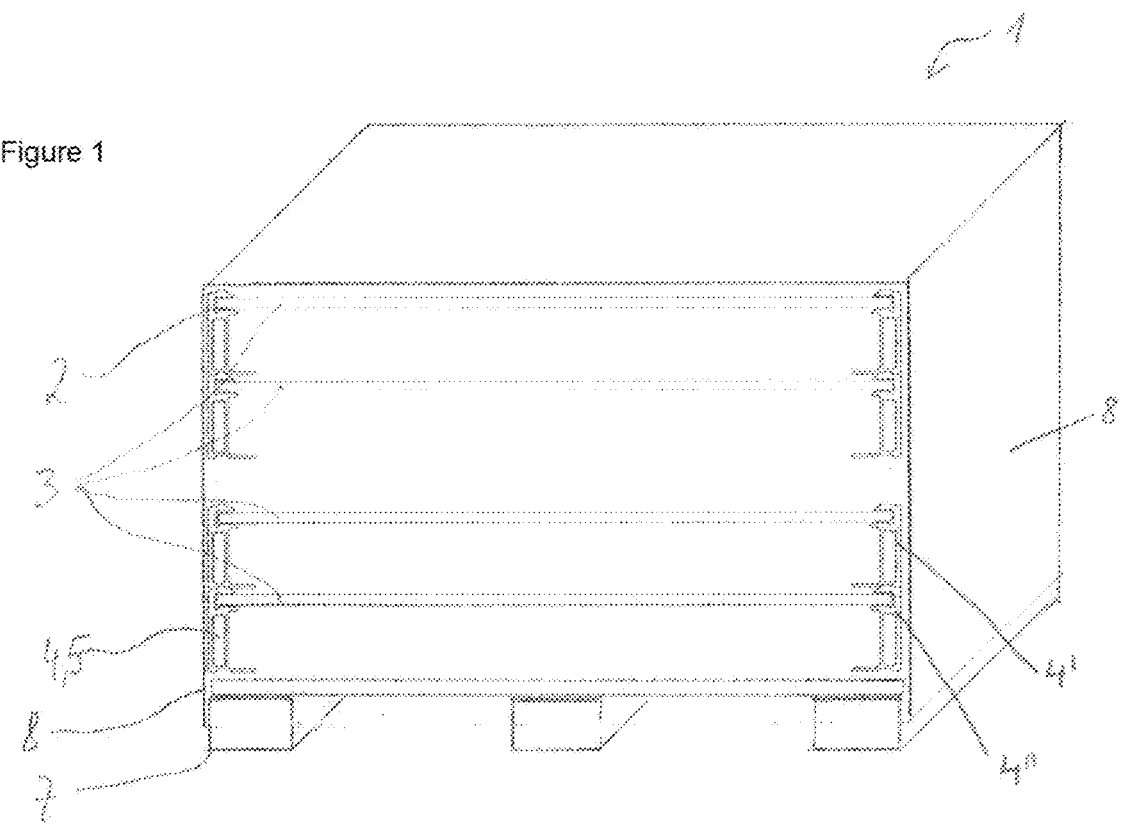

The invention relates to a stackable photovoltaic module consisting of at least one photovoltaic element of which the periphery is surrounded by a frame, the frame having, on the upper side and lower side thereof, at least one projection and/or at least one recess which engage in one another when a first frame is arranged on a second frame.

Photovoltaic modules convert the light from the sun into electrical energy. The module substantially consists of silicon-based solar cells that are mounted on a frame and covered by a glass plate. The storage and transport of the modules have been difficult up to now because the modules are placed or stacked one on top of the other. In particular, the modules must be prevented from slipping. In addition, the stacking creates a high total weight that has to be borne by the lower modules of the stack.

Some solutions for preventing the modules from slipping on one another are already known from the prior art.

DE 10 2011 113 143 A1 discloses a stacking bar with pressure relief for the transport of solar modules. The stacking bar is a separate component which is clamped onto the side of the solar module. In order to prevent the photovoltaic modules from slipping, the first stacking bar has a projection on the upper side, which engages in a recess in a second stacking bar. After the photovoltaic module has been installed, the stacking bar must either be disposed of or transported to the production site of the photovoltaic module for reuse, which is expensive.

DE102008051426A1 discloses a stackable photovoltaic module frame which surrounds the periphery of the semiconductor component. The frame is designed as a hollow profile and comprises so-called anti-slip elements. The anti-slip elements are projections and recesses which engage in one another when a plurality of frames are stacked one on top of the other. Furthermore, steps are also disclosed as anti-slip elements which, when stacked one on top of the other, interact with the step above and thereby prevent the frames from slipping. The anti-slip elements integrated into the frame all have angled, sharp edges. Such edges are good for preventing the frames from slipping on one another, but the sharp edges can cause damage to the frame surface when the modules are stacked.

EP 2 401 770 B1 discloses a device for photovoltaic modules that is suitable for transporting the modules. The device consists substantially of a hollow chamber profile which surrounds the periphery of the semiconductor component, the semiconductor component being located in a U-shaped receiving portion in the frame. The frame has different projections and recesses which engage in one another when they are stacked one on top of the other.

Some of the above-mentioned devices have sharp edges which, when a plurality of photovoltaic modules are stacked one on top of the other, cause damage to the module below. In addition, mounting the known hollow frame profiles on the periphery of the semiconductor component is only possible with great effort.

The problem addressed by the invention is therefore that of simplifying the mounting of a stackable photovoltaic module and, furthermore, of providing a module which does not cause any damage when a plurality of modules are stacked one on top of the other.

An essential feature is that the stackable photovoltaic module comprises a frame consisting of a plurality of frame elements which are connected by at least one connector.

The embodiment according to the invention is advantageous in that the individual frame elements can be easily plugged onto the side edges of the frameless photovoltaic elements. The individual frame elements are then connected by the connectors to form a surrounding frame.

In a first preferred embodiment, the frame consists of four frame elements which are connected by four connectors to form a square frame. The elongate frame elements meet one another at a miter joint. This means that the two intersections of the frame elements meet at the same angle, which results in a smooth transition between the adjoining frame elements. In addition, the contact surfaces or connection surfaces are enlarged and the stability of the connection between the two frame elements is increased.

In the preferred embodiment, the two frame elements have a miter joint having a 45° angle. The butt joint of the two frame elements is in the region of the corner (edge) so that it is less noticeable. The corner connector then acts like a miter clamp, which fixes the two adjoining frame elements.

In a further preferred embodiment, a plurality of frame elements comprising a plurality of miter joints are present on one side of the photovoltaic module. The individual frame elements are then connected by means of one connector each.

This is advantageous in that, in the case of particularly long photovoltaic elements, a plurality of frame elements can be arranged one behind the other, with no transition between the individual frame elements being detectable due to the miter joints.

The frame elements are preferably connected by a connector. In the context of the present invention, a connector is understood to be any connection technology which allows the two adjacent frame elements to be connected. The connector can, for example, be designed as a corner connector having a 90° angle.

In a first preferred embodiment, the connectors are pressed into the hollow chamber profile by means of press-in technology. Pressing-in takes place in such a way that the connectors on the PV modules are no longer visible in the finished state. However, it is also possible to arrange the connectors on the frame elements by means of an adhesive connection, a welded connection or a screw connection. A connector is understood to mean both a connector in the corner region of the frame and a connector on the side face of the frame.

The connectors preferably have a nominal 4% oversize (e.g., 5.9 to 5.2 mm) before the pressing-in process into the frame element, a connection being achieved by means of a friction-welded connection between the connectors and the frame elements. Other oversizes are also possible depending on the shape or type of frame elements. The connectors can also be compressed so as to have undersize. The corner connector is inserted into the hollow profile of the frame and then mechanically "clinched" in the manufacturing process.

The frame element preferably has a U-shaped receiving portion which is plugged onto the respective side edges of the solar cell or the photovoltaic element.

In a further preferred embodiment, the frame is designed as a hollow chamber profile comprising a cavity which is enclosed at the edge and which can be used for laying cables and/or lines.

The frame element preferably has only rounded projections and rounded depressions, which prevents damage to the other surfaces.

In a preferred embodiment, there is a rounded projection on the upper side of the frame element, i.e., on the highest point of the frame element. There is a rounded recess on the opposite side of the frame element. When a plurality of photovoltaic modules are stacked one on top of the other, the projection of the first frame element now engages in the recess of a second frame element which is arranged above the first frame element. The curves of the projection and the recess preferably have certain tolerances which allow the projection to slide into the recess. In addition, the curves prevent sharp edges and thus reduce damage when stacking. Owing to the special shape of the frame element, it is now possible to stack a plurality of photovoltaic modules, e.g., on pallets, one on top of the other, with loads being transferred carefully by means of the profiled frame elements.

The profile of the frame element is designed in such a way that the individual photovoltaic elements cannot come into contact when they are stacked one on top of the other. This is achieved by a profile web, which is located on the lower side of the frame element and partially extends in the longitudinal direction toward the center of the photovoltaic module. The profile web thus acts as a protective web or cover which prevents, in particular, an oblique stacking of the individual modules. The receiving web allows the frame profile to be widened in the longitudinal direction, so that it is easier to place the upper module comprising the recess on the module comprising the projection below.

In a further preferred embodiment, the frame element has drainage openings. The drainage openings allow condensation water or, in general, water that has penetrated the frame to drain away.

The subject matter of the present invention results not only from the subject matter of the individual patent claims, but also from the combination of the individual patent claims with one another.

All information and features disclosed in the documents, including the abstract, in particular the spatial configuration shown in the drawings, are claimed to be essential to the invention insofar as they are novel over the prior art, individually or in combination.

Insofar as individual subject matter is designated as "essential to the invention" or "important," this does not mean that this subject matter must necessarily form the subject matter of an independent claim. This is determined solely by the independent patent claim as filed.

In the following, the invention is explained in more detail with the aid of the drawings, which show only one embodiment. Further features and advantages of the invention that are essential to the invention are clear from the drawing and its description.

Figure 2:
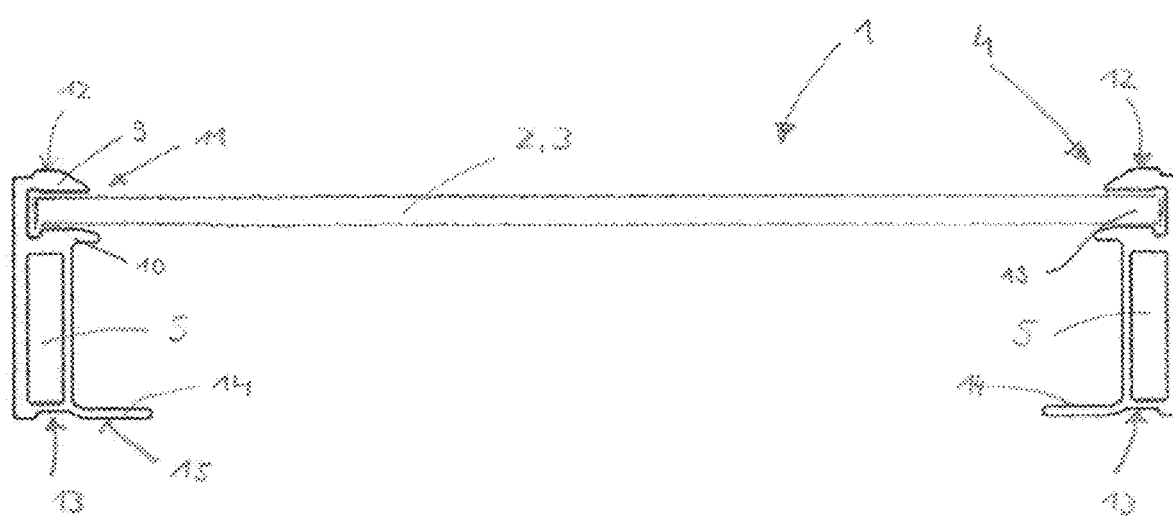
Figure 3:
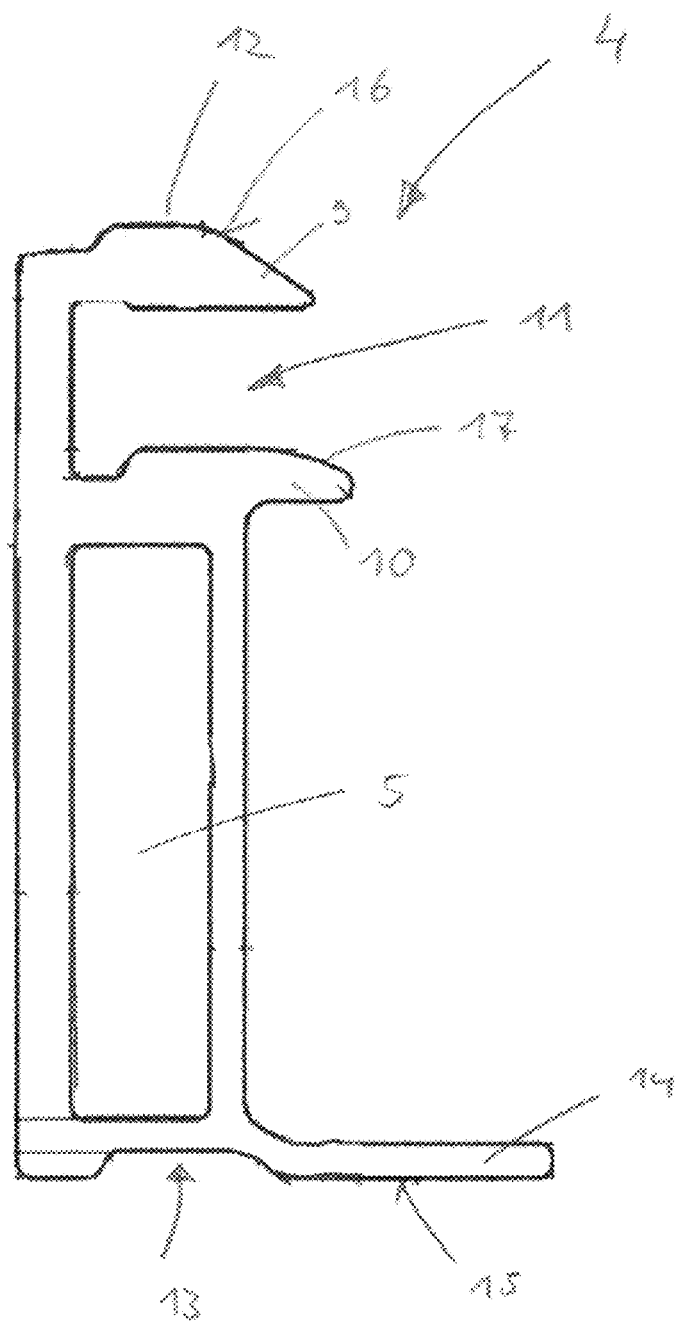
Figure 4:
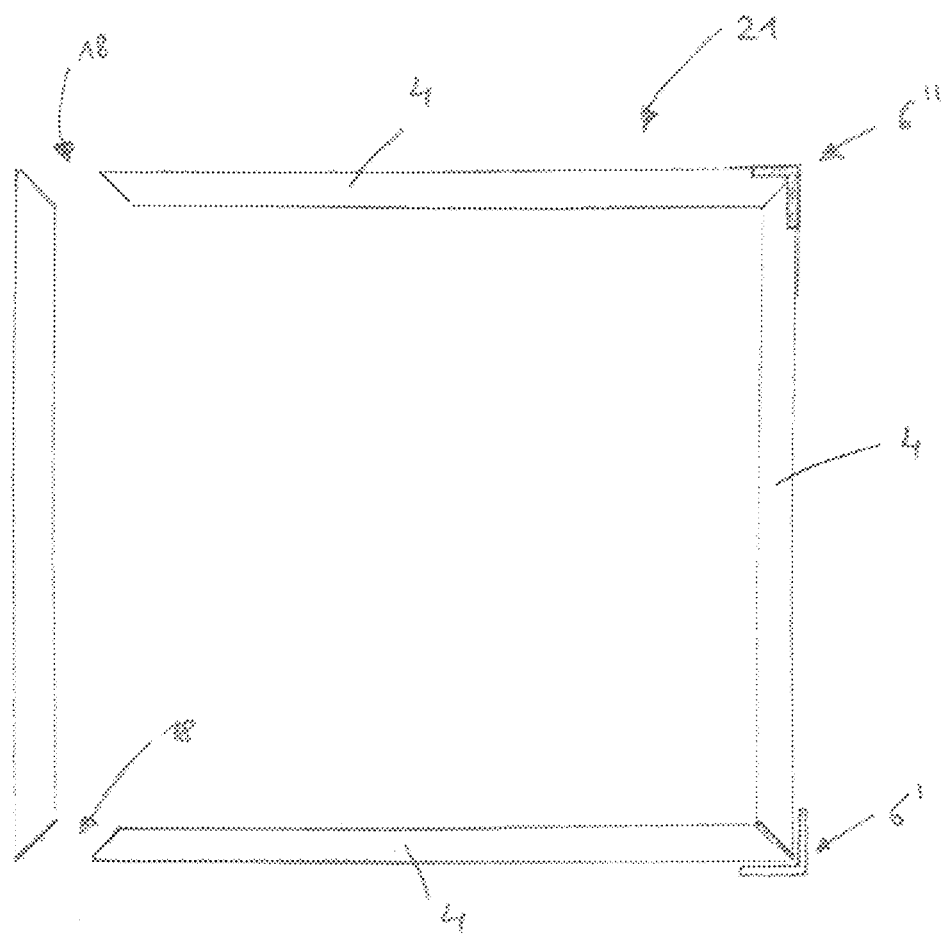
Figure 5:
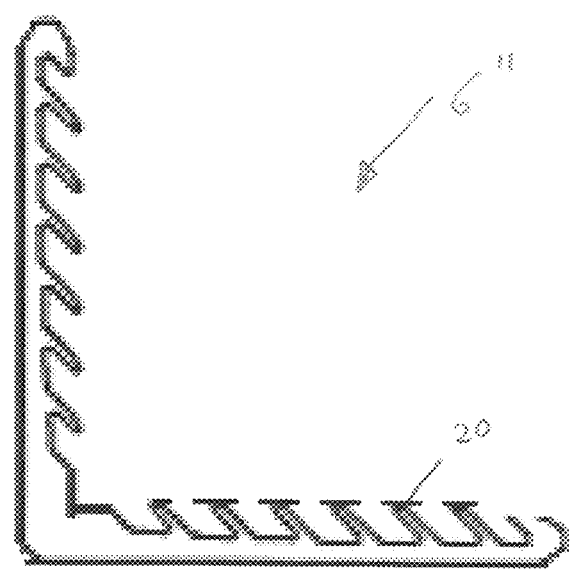
Figure 6:
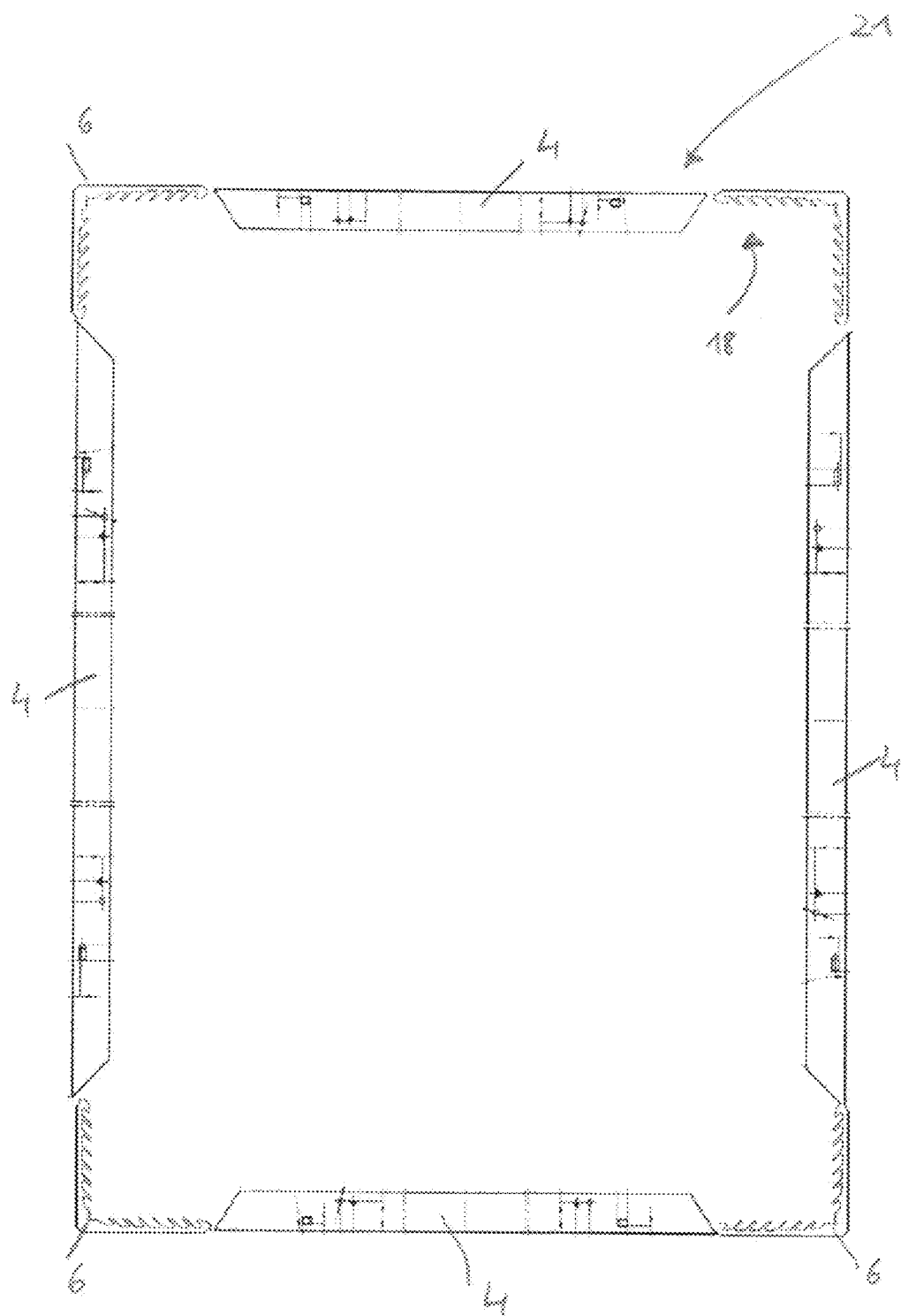
Figure 7:
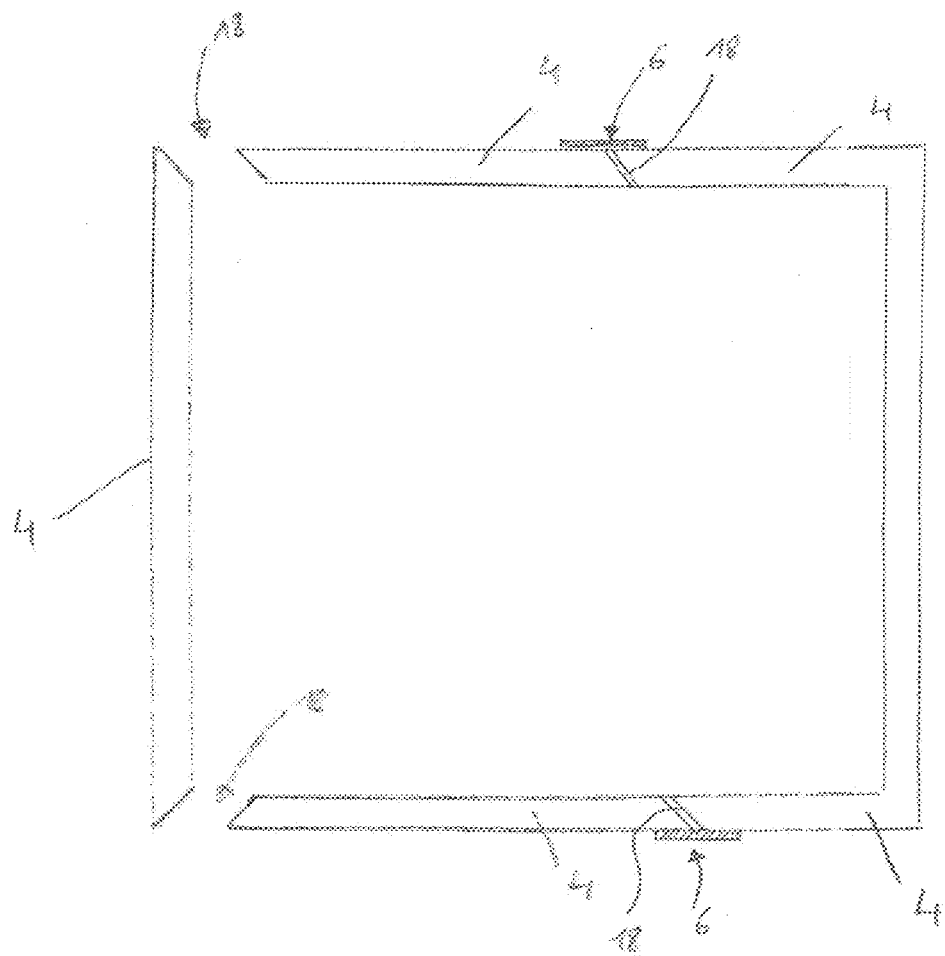
Figure 8:
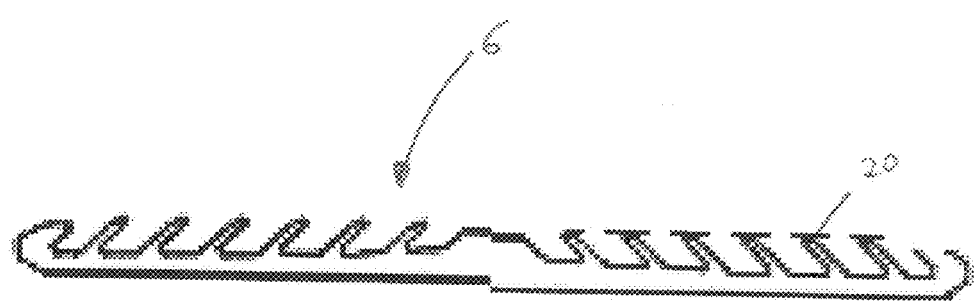

FIG. 1: sectional view of a plurality of stackable photovoltaic modules on a pallet FIG. 2: sectional view of the photovoltaic module according to the invention FIG. 3: sectional view of the frame element according to the invention FIG. 4: plan view of the frame elements comprising miter joints in the corner region and connectors FIG. 5: illustration of a corner connector FIG. 6: plan view of the photovoltaic module according to the invention FIG. 7: plan view of the frame elements comprising miter joints and straight connectors FIG. 8: illustration of a straight connector FIG. 1 shows a plurality of photovoltaic modules 1 which are arranged one on top of the other on a pallet 7. The photovoltaic modules 1 form a stack and are surrounded by a stretch film 8. The photovoltaic modules 1 are protected against contamination during transport by the stretch film 8.

A photovoltaic module 1 consists of a frame 21 which surrounds the periphery of the solar cell 2 or the photovoltaic element 3. The frame 21 consists of a plurality of frame elements 4, 4', 4" which are suitable for being arranged one on top of the other. This is clear from FIG. 1, which shows that, for example, a second frame element 4" is located above a first frame element 4'. The frame element 4 is profiled and has projections 12 and recesses 13 which engage in one another when the photovoltaic modules 1 are stacked, and thus fix the individual photovoltaic modules 1 in relation to one another.

The frame element 4 consists, for example, of a metal, plastics material, or the like and has a hollow chamber 5. The hollow chamber profile significantly reduces the weight of the frame 21. At the same time, the profiled design of the frame element 4 allows a high level of strength to be achieved. Another advantage of the hollow chamber profile is that connection cables, for example, can be guided in the hollow space 5, which cables are thus protected against damage.

The size of the photovoltaic modules 1 substantially corresponds to the size of a EUR-pallet. However, other sizes are also possible.

FIG. 2 shows the photovoltaic module 1 in detail. The photovoltaic module 1 consists of the frame elements 4, which are profiled and have a receiving portion 11 for the planar solar cell 2 or the photovoltaic element 3. The receiving portion 11 consists of an upper receiving portion limb 12 and a lower receiving portion limb 13, which are arranged so as to be vertically spaced and form a U-shaped receiving portion 11 for the planar solar cell 2 or the photovoltaic element 3.

The vertical distance between the upper receiving portion limb 12 and the lower receiving portion limb 13 preferably corresponds approximately to the plate thickness of the solar cell 2 or the photovoltaic element 3. This makes it possible for the receiving portion 11 of the frame element 4 to be plugged onto the solar cell 2 or the photovoltaic element 3.

There is a projection 12 in the region of the upper receiving portion limb 9. The dimensions of the projection 12 correspond approximately to the dimensions of the recess 13 which is located on the opposite side of the frame element 4. If a first frame element 4' is now arranged on a second frame element 4", the projection 12 of the first frame element 4' engages in the recess of the second frame element 4". This secures the position of the two frame elements 4' and 4' arranged one on top of the other or of the entire photovoltaic modules 1.

The receiving portion 11 is U-shaped, the length of the receiving portion 11 or the upper and lower receiving portion limbs 9, 10 being such that the solar cell 2 or the photovoltaic element 3 is held by the receiving portion 11 at least in the edge region, i.e., in the region of the side edge 19. The projection 12 on the upper receiving portion limb 9 is located in the region of the receiving portion 11, the recess 13 being located on the opposite side. Both the projection 12 and the recess 13 are thus located in the edge region of the solar cell 2 or the photovoltaic element 3. This results in a very good load transfer between the individual edge elements 4, 4' and 4", because the load created by a plurality of photovoltaic modules 1 arranged one on top of the other is almost completely transferred by the frame elements 4, 4' and 4".

FIG. 3 shows the frame element 4 comprising the receiving portion 11 in detail. The receiving portion 11 is formed by the two spaced receiving portion limbs 9, 10. The projection 12 is located on the upper side of the upper receiving portion limb 9, the recess 13 being in alignment on the opposite side. The shape of the projection 12 and the shape of the recess 13 are such that both parts, when a plurality of frame elements 4, 4', 4" are stacked one on top of the other, the projection 9 engages in the recess 10 and is held there in a form-fitting manner.

The upper side 16 of the upper receiving portion limb 9 has only round transitions having large radii. In particular, this avoids sharp edges or corners, which can cause damage when a plurality of photovoltaic modules 1 are stacked one on top of the other.

The lower receiving portion limb 10 has a chamfer 17 at the outer point, which is designed as an insertion chamfer. Owing to the chamfer, the edge element 4 can be more easily plugged onto the solar cell 2 or onto the photovoltaic element 3. In addition, the receiving portion limb 10, in particular in the region of the chamfer (17), has no edges, but only surfaces having radii. As a result, the photovoltaic element 2 or the PV composite in the region of the receiving portion 11 is particularly handled with care when the photovoltaic element or the PV laminate bends due to increased temperatures and/or due to oscillations/vibrations/impacts.

The frame element 4 has a profile limb 14 on the bottom side, which extends toward the center of the solar cell 2 or the photovoltaic element 3. The profile limb 14 is preferably longer than the limbs 9, 10 of the receiving portion 11. The profile limb 14 on the bottom side has a gripping surface 15 for a hand. As a result, the entire photovoltaic module 1 can easily be lifted by hand in the edge region without coming into contact with the solar cell 2 or the photovoltaic element 3.

FIG. 4 shows a plan view of a plurality of elongate frame elements 4 which abut one another at an angle. The frame elements 4 are connected in the corner regions by means of a miter joint 18. The end regions of the frame elements 4 preferably include an angle of 45°.

The two frame elements 4 abutting one another are fixed by a connector 6. The connector 6' can either be placed on the frame elements 4 and connected to the frame elements 4 by an adhesive, welding, soldering or screw connection, or the connector 6" is pressed into the frame elements 4 by a pressing-in process.

In the embodiment according to FIG. 4, a total of four frame elements 4 are put together to form a peripheral frame, each of the individual frame elements 4 being connected by a miter joint 18 and the connector 6. The frame elements 4 can thus be individually plugged onto the respective side edges 19 of the solar cell 2 or the photovoltaic element 3 and then connected thereto.

For example, two frame elements 4 can be connected to one another by pressing in the connector 6. Subsequently, the two L-shaped frame elements 4 are placed on the side edges 19 of the solar cell 2 or the photovoltaic element 3 and connected by two further connectors 6.

In a further embodiment, for example, all frame elements 4 can be individually plugged onto the side edges 19 and only then connected by the connectors 6.

FIG. 5 shows an L-shaped connector 6 which produces an interlocking connection to the adjoining frame elements 4 by means of a pressing-in force. Pressing in the connector is a manufacturing method from the field of joining technology. It allows an interlocking connection between the connector 6 and the frame element 4 without the use of auxiliary joining means. In order to achieve a better connection between the connector 6 and the frame element 4, the connector 6 has numerous lamellae 20 which engage in the material of the frame element 4.

FIG. 6 shows schematically the frame elements 4, which together form a frame 21. The frame elements 4 are connected by the connectors 6. All frame elements 4 each have a miter joint 18 at their ends. The connectors 6 are preferably pressed into the profile of the frame elements 4, which results in a smooth surface on the outside of the frame elements 4.

FIGS. 7 and 8 show a straight connector 6 which is designed to connect two straight, adjoining frame elements 4.

According to FIG. 7, the two adjoining frame elements 4 have a miter joint 18 and are connected to one another by a straight connector 6. By connecting two straight frame elements 4 by means of a straight connector 6, a plurality of frame elements 4 can now be arranged one behind the other on one side of the photovoltaic element 3. As a result, the frame elements 4 can be made shorter, for example, so that the frame elements 4 can be mounted on the photovoltaic element 3 more easily and quickly. In addition, by arranging a plurality of frame elements 4 one behind the other and by connecting them by means of the straight connectors 6, particularly long photovoltaic elements 3 can be surrounded by individual frame elements 4. On one side of the photovoltaic element 3, not only can two frame elements 4 be arranged one behind the other, but a plurality of frame elements 4 are also possible. The adjoining end regions (end faces) of the frame elements 4 have either a miter joint, a straight surface or a complementary surface for the connection to one another.

The connectors 6 according to FIG. 7 are arranged, for example, on the side face of the frame element 4. However, it is also possible for the frame element 4 to have a suitable recess in its side face for the connector 6. The connector 6 then no longer projects beyond the periphery of the frame element 4, but is completely received on the side face of the frame element 4. In addition, by pressing the connector 6 into the frame element 4, a completely planar side face can also be achieved on the frame element 4.

FIG. 8 shows the connector 6, which is designed as a straight connector comprising lamellae 20. Instead of the lamellae 20, the connector 6 can also have straight surfaces comprising recesses for, e.g., a detachable connection with a screw connection or rivet connection to the frame element 4

REFERENCE SIGN LIST

1. Photovoltaic module
2. Solar cell
3. Photovoltaic element
4. Frame element
5. Hollow chamber profile
6. Connector
7. Pallet
8. Stretch film
9. Upper receiving portion limb
10. Lower receiving portion limb
11. Receiving portion
12. Projection
13. Recess
14. Profile limb
15. Gripping surface
16. Upper side of 9
17. Chamfer
18. Miter joint
19. Side edge of 2 or 3
20. Lamellae

The invention claimed is:

1. A stackable photovoltaic module comprising:
at least one photovoltaic element;
at least one frame surrounding a periphery of a respective one of the at least one photovoltaic element, the at least one frame having a first side and a second side, a plurality of projections being defined on the first side and a plurality of recesses being defined on the second side, the plurality of projections and the plurality of recesses surrounding the periphery of the at least one photovoltaic element and being located in a region of side edges of the photovoltaic element spaced from corner regions of the at least one frame,
wherein each of the plurality of projections of a first one of the at least one frame is configured to engage a respective one of the plurality of recesses of a second one of the at least one frame when the first frame is arranged on the second frame, each of the plurality of projections and each of the plurality of recesses being configured such that each of the plurality of projections is held in a respective one of the plurality of recesses in a form-fitting manner,
wherein each frame of the at least one frame consists of a plurality of frame elements which are connected to one another by at least one connector, the frame elements comprising hollow chamber profiles, and
wherein a highest point of each of the plurality of frame elements is defined by one or more of the plurality of projections.

2. The stackable photovoltaic module according to claim 1, wherein the plurality of frame elements consists of four frame elements which are connected in corner regions of the at least one frame by four connectors.

3. The stackable photovoltaic module according to claim 1, wherein each of the frame elements of the plurality of frame elements have a miter joint, and a plurality of the frame elements with the miter joints are disposed on at least one side of the photovoltaic module.

4. The stackable photovoltaic module according to claim 1, wherein the at least one connector is configured to be pressed into a respective one of the plurality of frame elements to produce an interlocking positive connection between the connector and the respective one of the plurality of frame elements.

5. The stackable photovoltaic module according to claim 1, wherein each of the hollow chamber profiles have at least one hollow chamber in which connection lines for the photovoltaic module are located.

6. The stackable photovoltaic module according to claim 1, wherein each of the plurality of frame elements have a discharge opening.

7. The stackable photovoltaic module according to claim 1, wherein the each of the plurality of projections is arranged in alignment with a respective one of the plurality of recesses.

8. The stackable photovoltaic module according to claim 1, wherein each of the plurality of frame elements have a U-shaped receiver for the at least one photovoltaic element.

9. The stackable photovoltaic module according to claim 1, wherein each of the plurality of frame elements have a base-side profile limb comprising a gripping surface.

10. The stackable photovoltaic module according to claim 1, wherein the plurality of projections and the plurality of recesses are located exclusively in a region of side edges of the at least one photovoltaic element.

11. The stackable photovoltaic module according to claim 1, wherein the plurality of frame elements each have one miter joint, wherein two cut surfaces of adjoining ones of the plurality of frame elements abut one another and a gradual transition is thus produced between the adjoining ones of the plurality of frame elements.

12. A stackable photovoltaic module comprising:
at least two photovoltaic elements;
at least two frames surrounding a periphery of a respective one of the at least two photovoltaic elements, each of the at least two frames having a first side and a second side, a plurality of projections being defined on the first side and a plurality of recesses defined on the second side, the plurality of projections and the plurality of recesses surrounding the periphery of the at least one photovoltaic element and being located in a region of side edges of the photovoltaic element spaced from corner regions of the at least one frame,
wherein each of the plurality of projections of a first one of the at least two frames is configured to engage in a respective one of the plurality of recesses of a second one of the at least two frames when the first frame is arranged on the second frame, the plurality of projections and the plurality of recesses being configured such that each of the plurality of projections is held in a respective one of the plurality of recesses in a form-fitting manner,
wherein each frame of the at least two frames consists of a plurality of frame elements which are connected to one another by at least one connector, the frame elements comprising hollow chamber profiles, and
wherein a highest point of each of the plurality of frame elements is defined by one or more of the plurality of projections.

13. The stackable photovoltaic module according to claim 12, wherein the plurality of frame elements consists of four frame elements which are connected in corner regions of the at least two frames by four connectors.

14. The stackable photovoltaic module according to claim 12, wherein the each of the frame elements of the plurality of frame elements have a miter joint, and a plurality of the frame elements with the miter joints are disposed on at least one side of the photovoltaic module.

15. The stackable photovoltaic module according to claim 12, wherein the at least one connector is configured to be pressed into a respective one of the plurality of frame elements to produce an interlocking positive connection between the connector and the respective one of the plurality of frame elements.

16. The stackable photovoltaic module according to claim 12, wherein each of the hollow chamber profiles has at least one hollow chamber in which connection lines for the photovoltaic module are located.

17. The stackable photovoltaic module according to claim 12, wherein each of the plurality of frame elements has a discharge opening.

18. The stackable photovoltaic module according to claim 12, wherein each of the plurality of projections is arranged in alignment with a respective one of the plurality of recesses.

19. The stackable photovoltaic module according to claim 12, wherein each of the plurality of frame elements has a U-shaped receiver for the at least one photovoltaic element.

20. The stackable photovoltaic module according to claim 12, wherein each of the plurality of frame elements has a base-side profile limb comprising a gripping surface.

21. The stackable photovoltaic module according to claim 12, wherein the plurality of projections and the plurality of recesses are located exclusively in a region of side edges of the at least one photovoltaic element.

22. The stackable photovoltaic module according to claim 12, wherein the plurality of frame elements each have one miter joint, wherein two cut surfaces of adjoining ones of the plurality of frame elements abut one another and a gradual transition is thus produced between the adjoining ones of the plurality of frame elements.

23. The stackable photovoltaic module according to claim 1, wherein the frame element comprises a profile limb on a bottom side of the frame element that extends toward a center of the photovoltaic element, the profile limb having on its bottom side a gripping surface configured for lifting of the photovoltaic module by hand.

24. The stackable photovoltaic module according to claim 12, wherein the frame element comprises a profile limb on a bottom side of the frame element that extends toward a center of the photovoltaic element, the profile limb having on its bottom side a gripping surface configured for lifting of the photovoltaic module by hand.

* * * * *